United States Patent [19]

Schmidt

[11] Patent Number: 5,044,837

[45] Date of Patent: Sep. 3, 1991

[54] METHOD AND APPARATUS FOR CONTINUOUSLY FEEDING PARTICULATE SOLID MATERIAL INTO A PRESSURIZED SYSTEM WITHOUT PRESSURE LOSS

[75] Inventor: Thomas W. Schmidt, Ochelata, Okla.

[73] Assignee: Phillips Petroleum Company, Bartlesville, Okla.

[21] Appl. No.: 407,316

[22] Filed: Sep. 14, 1989

[51] Int. Cl.$^5$ ............................................. B65G 51/02
[52] U.S. Cl. ..................................... 406/85; 406/128; 406/169
[58] Field of Search .................... 406/85, 91, 89, 128, 406/169

[56] References Cited

U.S. PATENT DOCUMENTS

| | | | |
|---|---|---|---|
| 2,492,460 | 12/1949 | Botelho | 198/211 |
| 2,858,212 | 10/1958 | Durant et al. | 92/7 |
| 3,178,235 | 4/1965 | Zimmermann | 302/49 |
| 3,178,237 | 4/1965 | MacDonald et al. | 302/49 |
| 3,365,240 | 1/1968 | Gordon | 406/169 |
| 3,556,355 | 1/1971 | Ruiz | 222/368 |
| 3,603,646 | 9/1971 | Leoff | 406/89 |
| 3,610,476 | 10/1971 | Starrett | 222/194 |
| 3,805,827 | 4/1974 | Kennedy et al. | 137/516.17 |
| 3,861,830 | 1/1975 | Johnson | 406/85 |
| 3,913,795 | 10/1975 | Coucher et al. | 406/85 |
| 4,086,706 | 5/1978 | Lesk et al. | 406/91 |

FOREIGN PATENT DOCUMENTS 433079  5/1975  U.S.S.R. .............................. 406/128

OTHER PUBLICATIONS

Coal Feeder Development, Phase I Report, Mar., 1976, Foster-Miller Associates, Incorporated, Waltham, Massachusetts.

Primary Examiner—Sherman Basinger
Assistant Examiner—Stephen P. Avila
Attorney, Agent, or Firm—Laney, Dougherty, Hessin & Beavers

[57] ABSTRACT

A method and apparatus for continuously feeding particulate solid material into a pressurized system without pressure loss. The invention includes a rotary feeder for transferring particulate material to a high pressure system. In the feeder, chambers are filled with particulate material, and a rotor turns to empty the particulate material into the high pressure system. A compression cylinder is provided which has an inlet in communication with a high pressure chamber substantially empty of particulate material. The gas emptied from this chamber is forced by a piston in the compression cylinder into another chamber which is intially filled with particulate material at substantially atmospheric pressure. As the chamber which has been emptied of gas is brought into communication with the inlet of the feeder, any gas loss is substantially negligible because the gas is at approximately the same pressure as the inlet. The actuation of the piston and the inlet and outlet valves are controlled in response to the rotation of the rotor within the feeder.

20 Claims, 1 Drawing Sheet

5,044,837

METHOD AND APPARATUS FOR CONTINUOUSLY FEEDING PARTICULATE SOLID MATERIAL INTO A PRESSURIZED SYSTEM WITHOUT PRESSURE LOSS

BACKGROUND OF THE INVENTION

1. Field of the Invention

This invention relates to methods and apparatus for feeding particulate solids into pressurized systems, and more particularly, to a method and apparatus for such feeding of particulate solids in which gas in one portion of the apparatus is transferred to another portion of the apparatus without significant loss of the gas.

2. Description Of The Prior Art

There are a number of applications in which particulate solids are moved into a pressurized system. For example, in alternate fuels processing using coal, oil shale, or the like, the introduction of solids into a high pressure reactor is necessary. A problem with prior devices is that this has not been possible without an accompanying loss of gas pressure from the reactor.

One solution has been to pressurize a rotary feeder from an external source so that chambers or passageways in the feeder are raised to substantially the same pressure as the pressurized system to which the solids are to be transferred. After transfer of the solids, the chambers or passageways are vented down to a lower pressure, such as atmospheric pressure, so that they may be refilled with the solids. Such apparatus are disclosed in U.S. Pat. No. 3,178,235 to Zimmermann and U.S. Pat. No. 2,858,212 to Durant et al. A problem with these prior art apparatus and other such systems is that they are not closed, and an outside pressure source must be utilized and renewed as necessary.

The present invention solves this problem by providing an essentially closed compression system which transfers gas from a chamber substantially empty of solids to a chamber which has been filled with solids. In this way, there is no significant loss of gas pressure from the pressurized system, such as the high pressure reactor in alternate fuels processing.

SUMMARY OF THE INVENTION

The apparatus for continuously feeding particulate solid material into a pressurized system without significant pressure loss of the present invention includes a feeder comprising a case having inlet means for connecting to a supply of solids and an outlet means for connecting to a discharge location such as the pressurized system, a rotor rotatably disposed in the case, and means for compressing gas from a first one of the chambers and transferring the gas into another, second chamber. The rotor defines a plurality of solids transfer chambers which are preferably disposed along a periphery of the rotor. In one preferred embodiment there are at least six chambers.

The apparatus further comprises inlet valve means for exhausting gas from the first chamber into the compression means and outlet valve means for discharging compressed gas from the compression means into the second chamber. Valve control means may be provided for controlling actuation of at least one of the inlet and outlet valve means in response to rotation of the rotor. Further, control means may be provided for controlling the compression means in response to the rotation of the rotor. In the preferred embodiment, the number of cycles of the compression means per revolution of the rotor is equal to the number of chambers defined by the rotor.

Stated in another way, the apparatus of the present invention comprises a supply means for providing a supply of particulate material, a rotary feeder having a plurality of particulate moving chambers therein, and a compressor having an inlet in communication with a first chamber in the feeder and an outlet in communication with a second chamber in the feeder. Initially, the first chamber is substantially empty of particulate material but has a high pressure gas therein, and the second chamber has particulate material therein at substantially atmospheric pressure.

The present invention further includes a method of feeding solids into a pressurized system wherein the method comprises the steps of supplying solids to a multi-chamber feeder, exhausting gas from a chamber in the feeder which is substantially empty of solids, compressing and discharging the gas into a chamber in the feeder which is substantially filled with solids, and emptying the solids into the pressurized system. The method may further comprise controlling the steps of exhausting and compressing in response to actuation of the feeder. In one embodiment, the step of compressing comprises passing the gas through a reciprocating compressor, and may further comprise the step of controlling reciprocation of the compressor in response to movement of chambers in the feeder.

The step of exhausting gas preferably comprises passing the gas through a valve in communication with the first mentioned chamber which is an inlet valve to the compressor. The step of compressing and discharging comprises passing the compressed gas through another valve in communication with the second mentioned chamber, which valve is an outlet valve for the compressor.

An important object of the invention is to provide a method and apparatus for continuously feeding particulate solid material into a pressurized system without appreciable or significant pressure loss.

Another object of the invention is to provide a substantially closed system for transferring particulate solid materials.

A further object of the invention is to provide a particulate solids transfer apparatus which takes high pressure gas from one chamber in a feeder and transfers it to a relatively low pressure chamber in the feeder which is filled with particulate material.

Additional objects and advantages of the invention will become apparent as the following detailed description of the preferred embodiment is read in conjunction with the drawings which illustrate such preferred embodiment.

DESCRIPTION OF THE PREFERRED EMBODIMENT

Figure 1:
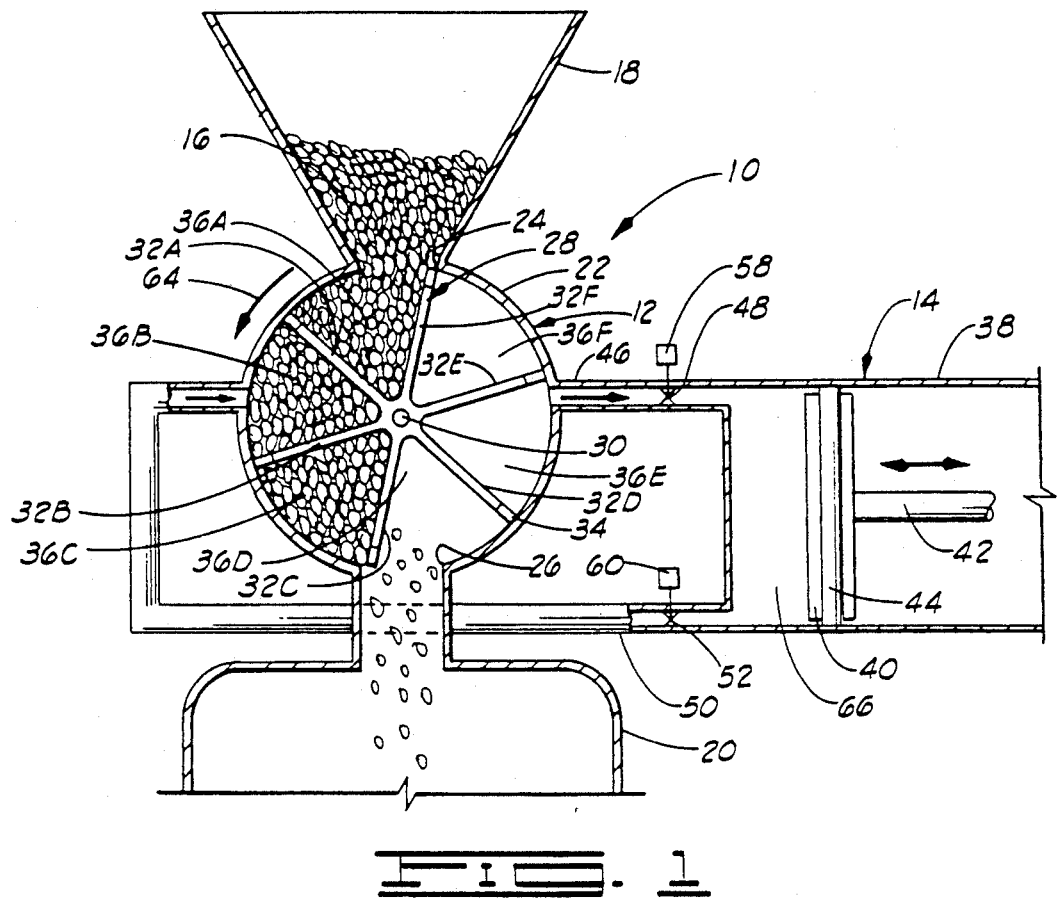
FIG. 1 shows a cross-sectional view in schematic form of the apparatus for feeding solids into a pressurized system without pressure loss of the present invention.

Referring now to the drawings, and more particularly to FIG. 1, the apparatus of the present invention for continuously feeding particulate solid materials into a pressurized system without pressure loss is shown and generally designated by the numeral 10. Apparatus 10 generally includes a rotary solids feeder 12 and a gas compressor 14 connected thereto. Feeder 12 transfers particulate solids 16 from a supply means 18 to a high pressure system 20, such as the high pressure reactor of an alternate fuels processing system.

Feeder 12 is preferably a multi-chamber rotary type of the kind known as a "star wheel" or "star valve" feeder. In the illustrated embodiment, feeder 12 includes an outer case 22 having an inlet means 24 for connecting to solids supply means 18 and an outlet means 26 for connecting to high pressure system 20. Supply means 18 is shown to be characterized as a tapered supply bin 18 which supplies solids 16 to inlet means 24 of feeder 12 by gravity.

Disposed in case 12 is a rotor 28 mounted on a shaft 30. Rotor 28 comprises a plurality of radially outwardly extending vanes 32A–32F, generally referred to as vanes 32. At the radially outer tip of each vane 32 is a sealing means 34 for sealingly engaging an inner surface of case 22 in a manner known in the art. Another sealing means (not shown) of a kind known in the art is provided for sealing between the longitudinal ends of rotor 28 and case 22.

It will be seen that vanes 32 of rotor 28 define a plurality of chambers 36A–36F, generally referred to as chambers 36, which open radially outwardly along the periphery of rotor 28. In FIG. 1, chambers 36A–36F are identified starting at the top of rotor 28 and going counterclockwise. It will be seen that vanes 32A–32F form the forward wall of chambers 36A–36F, respectively.

Compressor 14 is preferably a positive displacement type, such as a reciprocating compressor. In the illustrated embodiment, compressor 14 has a cylinder 38 with a piston 40 reciprocably disposed therein and mounted on a means for moving the piston, such as a piston rod 42. Piston 40 is shown in an intermediate position in its stroke in FIG. 1. A sealing means of a kind known in the art, such as piston ring 44, is provided on piston 40 for sealingly engaging the inner surface of cylinder 38.

An inlet line 46 interconnects cylinder 38 of compressor 14 and case 22 of feeder 12 at a location on case 22 which is in communication with chamber 36E when rotor 28 is in the position shown. An inlet valve 48 is generally disposed in inlet line 46. Actually, inlet valve 48 may be a separate valve in inlet line 46 or it may be a component built into compressor 14 or feeder 12.

An outlet line 50 interconnects cylinder 38 of compressor 14 with chamber 36B in feeder 12 when rotor 28 is in the position shown. An outlet valve 52 is generally disposed in outlet line 50, but as with inlet valve 48, may be a separate component in the outlet line or a built-in component of compressor 14 or feeder 12.

Figure 2:
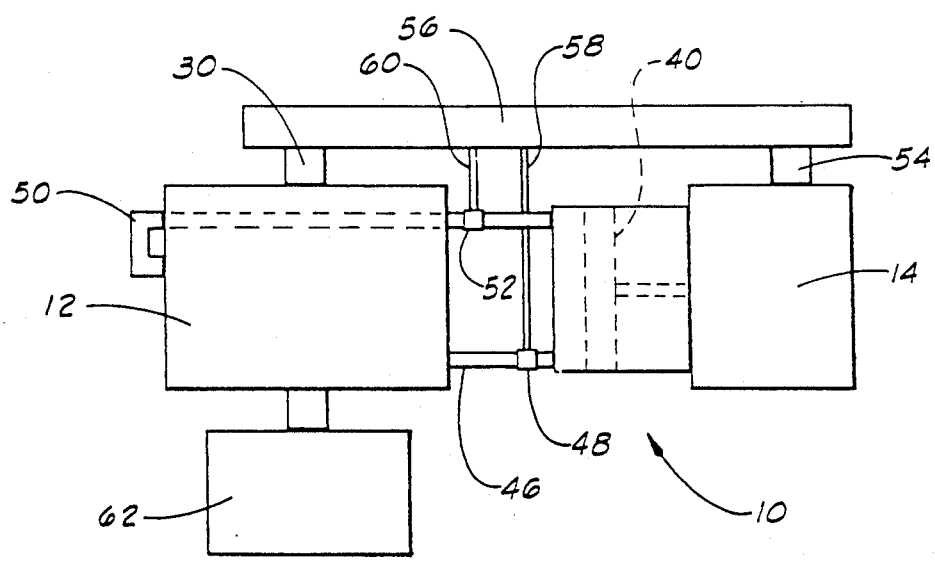
FIG. 2 is a plan, schematic view of the apparatus of FIG. 1.

Preferably, the actuation of piston 40 in compressor 14 is in response to the rotation of rotor 28 in feeder 12 and thus in response to the movement of chambers 36 in the feeder. Referring now to FIG. 2, in one preferred embodiment, this is accomplished by interconnecting shaft 30 of feeder 12 with a shaft 54 of compressor 14 by a control means such as gear train 56 which acts as the control means. The exact configuration of gear train 56 is not shown in this disclosure, but the operation of compressor 14 in conjunction with feeder 12 will be discussed in more detail herein.

Referring to both FIGS. 1 and 2, inlet valve 48 is preferably controlled by a control or actuation means 58 in response to rotation of rotor 28 in feeder 12 and/or in response to reciprocation of piston 40 in compressor 14. Similarly, outlet valve 52 is preferably controlled by a control or actuation means 60, also in response to rotation of rotor 28 in feeder 12 and/or in response to reciprocation of piston 40 in compressor 14. In the embodiment shown in FIG. 2, and as will be discussed in more detail herein, actuation means 58 and 60 may be connected to, and form a part of, gear train 56 for precise opening and closing of inlet valve 48 and outlet valve 52, respectively. However, in some cases, depending upon the speed of operation of feeder 12 and compressor 14, and also depending upon the pressures involved, inlet valve 48 and outlet valve 52 may be of a conventional compressor valve design, such as a spring biased, pressure actuated valve A valve of this general type is disclosed in U.S. Pat. No. 3,805,827 to Kennedy et al.

Rotation of rotor 28 in feeder 12 may be by any means known in the art, such as by connection of shaft 30 to a prime mover 62. The invention is not intended to be limited to the drive configuration shown in FIG. 2.

OPERATION OF THE INVENTION

Referring again to FIG. 1, when rotor 28 is in the general position shown, particulate solids 16 will be fed into chamber 36A by gravity from supply means 18 through inlet means 24. As rotor 28 rotates, it will be seen that the chamber filled with particulate solids will be moved in a counterclockwise direction from inlet means 24 to outlet means 26 as indicated by arrow 64 until the chamber is in the position indicated by chamber 36D, at which point the particulate solids will fall by gravity into high pressure system 20. The empty chamber rotates counterclockwise from outlet means 26 to inlet means 24 until it is again in the position shown by chamber 36A, at which point it is refilled with solids. Rotation of rotor 28 is substantially continuous, so the chamber positions constantly change sequentially.

The above-described operation of feeder 22 is conventional. A problem with prior systems is the loss of gas pressure from high pressure system 20. When chamber 36D is aligned with outlet means 26 of feeder 12 and thus in communication with high pressure system 20, it will be seen that chamber 36D is filled with gas at high pressure. Unless this gas pressure is relieved, when the gaspressurized chamber is brought into communication with inlet means 24, as indicated by chamber 36A, the gas will be lost through the inlet means because supply means 18 is at a much lower pressure, generally atmospheric pressure This loss of gas results in an undesirable drop in pressure in high pressure system 20. The present invention solves this problem in the following manner.

As rotor 28 turns within case 22 of feeder 12, the chamber identified by the numeral 36D will be moved to the position indicated by the numeral 36E. That is, a chamber having high pressure gas therein as a result of its communication with high pressure system 20 through outlet means 26 will be brought into communication with inlet line 46 as vane 32E moves past the inlet line. At about the time this occurs, inlet valve 48 will be opened by actuation means 58, and at approximately the same time, piston 40 in cylinder 38 will be moved outwardly toward bottom dead center, or to the right in FIG. 1, thereby increasing the volume of compression chamber 66. As this occurs, compression chamber 66 is filled through inlet valve 48 with the gas from high pressure chamber 36E. Preferably, compression chamber 66 is sized such that the pressure in chamber 36E is reduced to approximately atmospheric pressure during this portion of the operation.

After compression chamber 66 has been filled with gas, inlet valve 48 is closed by actuation means 58, and outlet valve 52 is opened by actuation means 60. Approximately simultaneously, piston 40 will be moved inwardly toward top dead center, or to the left in FIG. 1, thereby reducing the volume of compression chamber 66 and forcing the gas out of cylinder 38 through outlet valve 52 into outlet line 50. The gas is forced through outlet line 50 into chamber 36B which is filled with solids, initially at approximately atmospheric pressure. Preferably, chamber 36B is pressurized to approximately the same pressure as in high pressure system 20.

As mentioned, during the actuation of piston 40, rotor 28 is turning substantially constantly. As pressure filled chamber 36B is rotated to the position indicated by numeral 36D, the particulate material falls into high pressure system 20, and the cycle starts again. Also during the rotation of rotor 28, evacuated chamber 36E is rotated to the position indicated by numeral 36A, at which point it is filled with particulate material. Although a small amount of gas remains in the chamber at this point, it is at substantially the same pressure as is in supply means 18. Thus, any gas loss is minimized. Certainly, the great gas losses which would occur if the chamber were still at high pressure when brought into communication with supply means 18 do not occur. Thus, it can be said that the entire system is substantially closed and that there is no appreciable or significant gas pressure loss.

In the preferred embodiment, gear train 56 is designed such that as rotor 28 in feeder 12 moves one increment (as chamber 36D is moved to the position indicated by chamber 36E), piston 40 is actuated through one complete reciprocating cycle in cylinder 38. In the preferred embodiment with six chambers formed by rotor 28, it will thus be seen that there are six complete cycles of piston 40 for every full revolution of rotor 28 in feeder 12. It is contemplated that the actual components of gear train 56 are conventional, and therefore they have not been detailed herein. However, the actuation relationship between piston 40 and rotor 28 is the important aspect of the invention, and any other drive means known in the art, such as a chain drive, could be used as well as a gear drive.

If actuation means 58 and 60 are tied into and become a part of gear train 56, then, in the preferred embodiment, inlet valve 48 is opened at the beginning of the outward stroke of piston 40 and closed near the end thereof. Similarly, outlet valve 52 is actuated by actuation means 60 so that it opens near the beginning of the inward stroke of piston 40 and closes at the end of that inward stroke. By mechanically tying in actuation means 58 and 60 into gear train 56, it will be seen that inlet valve 48 and outlet valve 52 are precisely actuated in response to rotation of rotor 28. As previously indicated, such precise mechanical actuation may not always be necessary, and under some conditions, inlet valve 48 and outlet valve 52 may be pressure actuated in the same general manner as conventional compressor valves.

It will be seen, therefore, that the method and apparatus for continuously feeding particulate solid material into a pressurized system without pressure loss of the present invention are well adapted to carry out the ends and advantages mentioned as well as those inherent therein. While a presently preferred embodiment has been shown for the purposes of this disclosure, numerous changes in the arrangement and construction of parts may be made by those skilled in the art. All such changes are encompassed within the scope and spirit of the appended claims.

What is claimed is:

1. An apparatus for transferring solids comprising:
   a case having inlet means for connecting to a supply of the solids and an outlet means for connecting to a discharge location;
   a rotor rotatably disposed in said case, said rotor defining a plurality of solids transfer chambers; and
   means for compressing gas from one of said chambers and transferring said gas to another of said chambers, said means comprising a gas compressor having a reciprocating piston therein, wherein a stroke of said piston is controlled by rotation of said rotor.

2. The apparatus of claim 1 wherein said chambers are disposed along a periphery of said rotor.

3. The apparatus of claim 1 wherein there are at least six of said chambers.

4. The apparatus of claim 1 further comprising: inlet valve means for exhausting gas from said one chamber into said compression means; and outlet valve means for discharging compressed gas from said compression means into the other chamber.

5. The apparatus of claim 4 further comprising valve control means for controlling actuation of at least one of said inlet and outlet valve means in response to rotation of said rotor.

6. The apparatus of claim 1 wherein said stroke of said piston is controlled by a gear train engaged with said rotor.

7. The apparatus of claim 1 further comprising control means for controlling said compression means in response to rotation of said rotor.

8. An apparatus for moving particulate material into a high pressure system, said apparatus comprising:
   a supply means for providing a supply of particulate material;
   a rotary feeder having a plurality of particulate moving chambers therein, an inlet in communication with said supply means, an outlet connectable to the high pressure system, and a shaft;
   a compressor having an inlet in communication with a first chamber in said feeder, said first chamber having a high pressure gas therein, and an outlet in communication with a second chamber in said feeder, said second chamber having a particulate material therein;
   an inlet valve in communication with said inlet of said compressor and geared to said shaft of said feeder; and
   an outlet valve in communication with said outlet of said compressor and geared to said shaft of said feeder;
   wherein, actuation of at least one of said inlet and outlet valves is in response to movement of said chambers in said feeder.

9. The apparatus of claim 8 wherein the number of compression cycles per complete cycle of said feeder is equal to the number of chambers in said feeder.

10. The apparatus of claim 8 wherein said first and second chambers are on substantially opposite sides of said feeder.

11. An apparatus for moving particulate material into a high pressure system, said apparatus comprising:
- a supply means for providing a supply of particulate material;
- a rotary feeder having a plurality of particulate moving chambers therein, an inlet in communication with said supply means, an outlet connectable to the high pressure system, and a shaft; and
- a compressor having an inlet in communication with a first chamber in said feeder, said first chamber having a high pressure gas therein, and an outlet in communication with a second chamber in said feeder, said second chamber having particulate material therein, wherein a compression cycle of said compressor is in response to movement of said chambers in said feeder, said compressor being geared to said shaft of said feeder.

12. The apparatus of claim 11 wherein the number of compression cycles per complete cycle of said feeder is equal to the number of chambers in said feeder.

13. The apparatus of claim 11 wherein said first and second chambers are on substantially opposite sides of said feeder.

14. An apparatus of moving particulate material into a high pressure system, said apparatus comprising:
- a supply means for providing a supply of particulate material;
- a rotary feeder having a rotor, a plurality of particulate moving chambers therein formed on a periphery of said rotor, an inlet in communication with said supply means, and an outlet connectable to the high pressure system; and
- a compressor having an inlet in communication with a first chamber in said feeder, said first chamber having a high pressure gas therein, and an outlet in communication with a second chamber in said feeder, said second chamber having particulate material therein.

15. The apparatus of claim 14 further comprising an inlet valve in communication with said inlet of said compressor and an outlet valve in communication with said outlet of said compressor.

16. The apparatus of claim 15 wherein actuation of at least one of said inlet and outlet valves is in response to movement of said chambers in said feeder.

17. The apparatus of claim 14 wherein a compression cycle of said compressor is in response to movement of said chambers in said feeder.

18. The apparatus of claim 17 wherein the number of compression cycles per complete cycle of said feeder is equal to the number of chambers in said feeder.

19. The apparatus of claim 14 wherein there are at least six of said chambers.

20. The apparatus of claim 14 wherein said first and second chambers are on substantially opposite sides of said feeder.

* * * * *